United States Patent [19]

Biagioli et al.

[11] Patent Number: 5,635,275
[45] Date of Patent: Jun. 3, 1997

[54] LAMINATION OF NON-APERTURED THREE-DIMENSIONAL FILMS TO APERTURED THREE-DIMENSIONAL FILMS AND ARTICLES PRODUCED THEREFROM

[75] Inventors: John D. Biagioli, Puyallup, Wash.; Timothy L. Clark, Sullivan; Gary A. Otte, Brazil, both of Ind.

[73] Assignee: Tredegar Industries, Inc., Richmond, Va.

[21] Appl. No.: 286,475

[22] Filed: Aug. 5, 1994

[51] Int. Cl.$^6$ ................................ B32B 3/24; B32B 3/26
[52] U.S. Cl. .................... 428/132; 428/131; 428/138; 428/166; 428/172; 156/292; 156/309.6
[58] Field of Search .................. 428/182, 183, 428/184, 131, 132, 311.7, 318.6, 316.6, 138, 166, 178, 172; 128/849; 156/145, 209, 292, 470–473, 309.6

[56] References Cited

U.S. PATENT DOCUMENTS

| | | | |
|---|---|---|---|
| 3,033,723 | 5/1962 | Mead | 154/49 |
| 3,142,599 | 7/1964 | Chavannes | 156/210 |
| 3,231,454 | 1/1966 | Williams | 161/110 |
| 3,628,720 | 12/1971 | Schmedding | 229/55 |
| 3,940,529 | 2/1976 | Hepford et al. | 428/184 |
| 4,412,879 | 11/1983 | Ottaviano | 156/145 |
| 4,518,643 | 5/1985 | Francis | 428/131 |
| 4,555,811 | 12/1985 | Shimalla | 128/849 |
| 4,629,643 | 12/1986 | Curro et al. | 428/131 |
| 4,657,625 | 4/1987 | Kawakami | 156/471 |
| 4,891,258 | 1/1990 | Fahrenkrug | 428/184 |
| 4,894,265 | 1/1990 | Chang et al. | 428/184 |
| 4,895,749 | 1/1990 | Rose | 428/132 |
| 4,995,930 | 2/1991 | Merz et al. | 156/209 |
| 5,158,819 | 10/1992 | Goodman, Jr. et al. | 428/131 |

OTHER PUBLICATIONS

PCT Search Report for PCT/US95/09829 mailed 05 Dec. 1995.

*Primary Examiner*—Michele K. Yoder
*Attorney, Agent, or Firm*—Emch, Schaffer, Schaub & Porcello

[57] ABSTRACT

The present invention provides an improved method for laminating a first three-dimensional apertured or non-apertured film material to a second flat or three-dimensional apertured or non-apertured film material utilizing the heat generated by the extrusion of the first and/or second materials and the films produced thereby.

9 Claims, 5 Drawing Sheets

LAMINATION OF NON-APERTURED THREE-DIMENSIONAL FILMS TO APERTURED THREE-DIMENSIONAL FILMS AND ARTICLES PRODUCED THEREFROM

TECHNICAL FIELD

The present invention relates to the application or lamination of a first film material onto a second material utilizing the heat generated by extrusion of the first and/or second film materials. The present invention is especially useful in laminating an apertured film to a non-apertured three-dimensional or formed film. The present invention is also especially useful for laminating a three-dimensional non-apertured film to another three-dimensional non-apertured film.

BACKGROUND OF THE INVENTION

Many types of substrates including paper, non-woven laminates, foils, films, sheeting wood and other materials have been coated using an extrusion coating method. The extrusion coating process generally includes an extruder slot (cast) die mounted in a position above the substrate to be coated.

In the processes where nip rolls are utilized to apply a coating material to a substrate, the nip rolls add pressure to the substrate and coating material at the interface. However, the nip pressure used in extrusion coating technology causes distortion of the coating material and the substrate at the nip interface.

Previous attempts to laminate a three-dimensional material onto thin film materials which are particularly sensitive to excessive thermal loads have not met with success. In particular, the application of a three-dimensional apertured or non-apertured material to another three-dimensional apertured or non-apertured material has been especially difficult to achieve. In such cases, there must be sufficient thermal energy to cause the first three-dimensional non-apertured film material and the second three-dimensional non-apertured film material to melt and fuse together. Often these materials do not have sufficient mass to resist distortion under the required thermal load necessary to achieve a good bond between the film materials.

It is therefore an object of the present invention to provide an improved method for laminating a three-dimensional apertured or non-apertured film material to a flat or three-dimensional apertured or non-apertured film material.

It is another object of the present invention to provide an improved composite laminated film comprising a three-dimensional apertured or non-apertured film material laminated to a flat or three-dimensional apertured or non-apertured film material.

It is still another object of the present invention to provide an article suitable for use as a disposable absorbent product such as diapers, catamenial pads, surgical dressings and the like.

DISCLOSURE OF THE INVENTION

The present invention relates, in part, to a method for producing a laminated film having at least one three-dimensional apertured or non-apertured film material laminated to at least one flat or three-dimensional apertured or non-apertured film material and the films produced thereby.

In order to have a thermoplastic material adhere or bond to another material, at least one of the materials must be supplied at a sufficiently elevated temperature at a point of interface. The interface is the point at which the two materials come into contact with each other. The temperature must be sufficiently elevated so that there is sufficient thermal energy supplied at the point of interface. The elevated temperature causes at least one of the following: melting and fusing of each of the materials together to form a bond, a chemical reaction of one material with the other material to form a bond, or melting of one material on the other material (non-melted) to form a cohesive bond.

It is important to understand that since the viscosity of fluids correlates to the temperature of the fluids, the higher the temperature, the less viscous the fluid. Therefore, maintaining a high temperature (i.e., low viscosity) as one material contacts the other material is important. This maintenance of thermal energy as, and after, the materials contact each other is controlled by two parameters of thermal dynamics, i.e., temperature and mass. At least one material must be supplied at a sufficiently elevated temperature and at a sufficient mass in order to achieve a good bond. The materials being laminated together must be maintained at that sufficiently elevated temperature for a sufficient time for the bond to form.

Polymers, and in particular thermoplastic polymers useful for laminating to other thermoplastic or non-thermoplastic materials, have well-defined upper limits of temperature which can be manipulated before degradation of the polymer occurs. The well-defined thermal degradation limit of the polymer necessarily controls the amount of heat supplied to the lamination process. The other parameter which can be controlled is the mass of the materials being laminated together. Generally, the mass is controlled by regulating the thicknesses of the materials. In various extrusion applications, it is desired to laminate a thin material to another material. However, if too thin a layer is laminated, the layer quickly loses heat and cools too quickly. Without sufficient heat, the low mass of the laminating material does not bond to the other material. Therefore, the lamination of one material to another material is limited by the parameters of mass and temperature of the materials and by the length of time at which the materials are maintained at the proper temperature.

The thermal requirements of the lamination process are further affected if both materials are thermally sensitive materials. The amount of thermal energy applied to the thermally sensitive materials is necessarily limited by the amount of thermal energy the materials substrate can tolerate without being damaged. This is especially true for a material which is a three-dimensional polymeric film having microscopic protuberances (either open or closed). In applications where the microscopic protuberances have been opened or exploded such that there are apertures in the film, the thickness (and mass) of the film at the open ends of the protuberances is further reduced. The thinness of the open ends of the protuberances results in a film material having a cloth-like or silky tactile effect which is desired in many film applications. However, these microscopic film protuberances (either open or closed) are sensitive to temperature and have the lowest mass point of the polymeric film and, as such, are the most critical to protect. While it would be desirable to laminate another thermoplastic or non-thermoplastic material to such type of three-dimensional thermoplastic film material, various difficulties occur when using the currently known coating technologies. In particular, both the thermal energy of the known extrusion coating systems and the compressive energy of the nip roll systems have, until the present invention, made it virtually impossible to achieve good bonding strength between the microscopic protuberance-filled three-dimensional material and any material laminated thereto without causing the destruction of the microscopic protuberances.

It is important that the microprotuberances not be crushed or destroyed during lamination of the three-dimensional film material to another film material. It is also important that any temperatures and/or pressures applied during the lamination process not cause the film materials being laminated together to be destroyed.

According to one embodiment of the present invention, a first thermoplastic material is extruded onto a film forming screen having a top surface and a bottom surface and having a plurality of perforations extending through the screen. A pressure differential is applied to a portion of the bottom surface of the film forming screen such that portions of the extruded film material are drawn into the perforations in the screen. The pressure differential pulls the portions of film material into the perforations in the screen and a plurality of three-dimensional microprotuberances are formed. If the pressure differential is sufficiently great, the microprotuberances are ruptured such that apertures are formed in the film. In other embodiments, the pressure differential is controlled such that no apertures are formed. The microprotuberances can have any combination of shapes; for example, the microprotuberances can be circular, hexagonal, quadrangular and the like. Likewise, the depth and width of the apertures can greatly vary, depending on the thickness by weight of the film material.

A second material is laminated to the first thermoplastic film. In certain embodiments, the second material comprises a three-dimensional apertured material wherein the second material is laminated to the first material at a point prior to the formation of the microprotuberances in the first material. In other embodiments, the second thermoplastic material comprises a non-apertured flat or three-dimensional formed film wherein the second material is laminated to the first material at a point after formation of the microprotuberances in the first film material.

According to the present invention, various thermoplastic films are suitable for use as either first material and/or the second material. Useful films include such films as polyethylene, polypropylene, ethylene vinyl acetate and other such polymeric materials. It is to be understood that the second material can also be a non-thermoplastic material such as paper, tissue or foil. It is to be understood that either or both of the films to be laminated can include other ingredients such as surfactants to modify the film's surface energy. In such embodiments, these surfactants allow control of fluid flow onto or through the laminate material. It is further to be understood that the first and/or second materials can comprise more than one layer. In particular, the film materials can be coextruded materials. Each layer of the coextruded material can have different properties which enhance lamination of the first material to the second material and/or provide other advantages to the laminate film.

It is to be understood that each three-dimensional film has a planar surface and a three-dimensional surface. According to the present invention, either the planar surface or the three-dimensional surface of the first material can be laminated to either the planar surface or the three-dimensional surface of the second material. In one preferred embodiment, a thermally sensitive three-dimensional apertured film can be laminated to a thermally sensitive three-dimensional non-apertured film such that there is good bond strength between the apertured film and the non-apertured film without causing thermal distortion or damage to the microprotuberances of either film.

It is also to be understood that the first film material and the second film material can comprise more than one layer of material. In a particularly preferred embodiment, a composite laminate film comprises a first non-apertured three-dimensional film having a planar side and a three-dimensional side and a second non-apertured three-dimensional film having a planar side and a three-dimensional side, wherein the three-dimensional side of the second non-apertured film is laminated to the planar side of the first non-apertured film. The composite film further has a nonwoven layer comprised of a substantially liquid pervious fibrous materials adjacent the planar side of the second non-apertured film.

Thus, composite articles of the present invention provide highly desirable liquid impervious or liquid pervious characteristics and also provide the advantage of the desired tactile suede or cloth-like properties to the article produced with such films.

BEST MODE OF CARRYING OUT INVENTION

Figure 1:
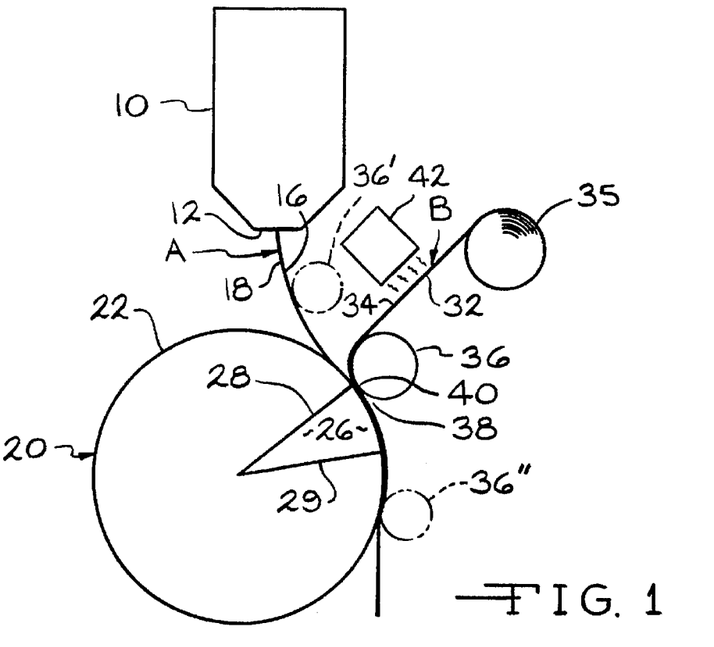
FIG. 1 is a simplified cross-sectional schematic illustration of one process for laminating a material B onto one side of a material A.
Figure 1A:
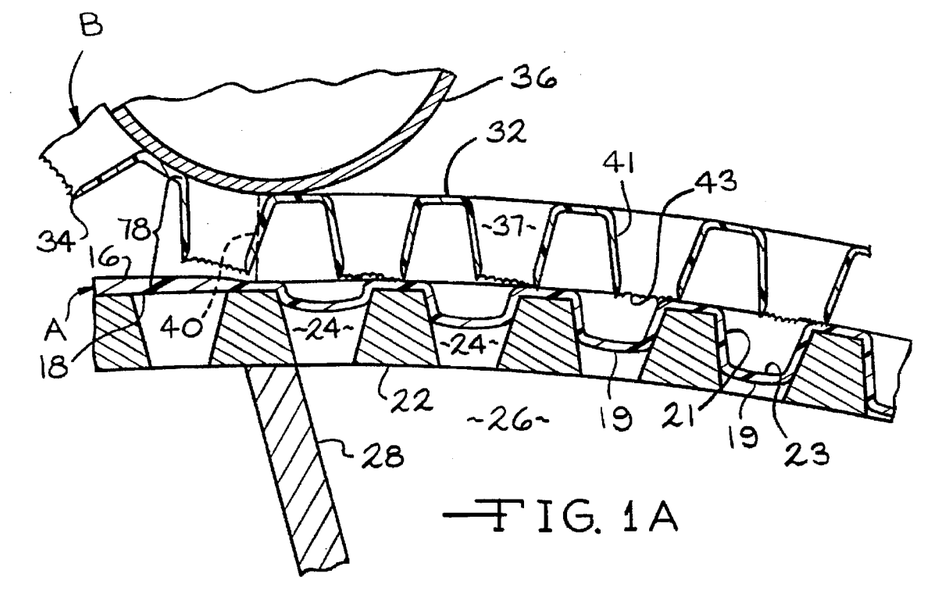
FIG. 1A is a greatly enlarged cross-sectional illustration of the gap area shown in FIG. 1.

One embodiment of the present invention is generally shown in FIGS. 1 and 1A. A first material A is dispensed from a slot die 10 having an aperture 12 onto a moving member 20. It is to be understood that the moving member can be a cylindrical screen or a conveyor belt type apparatus or other moving member. For ease of illustration, the moving member is depicted herein as a cylindrical screen. In preferred embodiments of the present invention, the aperture 12 is spaced at a predetermined distance from the screen 20. The screen 20 has a surface 22 which is highly perforated with perforations 24 (seen in FIG. 1A) shown in a greatly enlarged manner for ease of illustration. The perforations 24 extend through the surface 22 to allow fluid such as air to pass through the surface 22 of the screen 20. A vacuum chamber 26, preferably located within the screen 20, is utilized to create a pressure differential.

The material A, being dispensed onto the screen 20, has a top surface 16 and a bottom surface 18. The vacuum chamber 26 creates a pressure differential between the top surface 16 and the bottom surface 18 of the material A. The pressure differential causes portions of the material A to be pulled into the perforations 24 in the screen 20. The pressure differential is sufficient to produce three-dimensional microprotuberances 19 on the bottom surface 18 of the material A, as best seen in FIG. 1A. In various embodiments, the pressure differential is sufficient to cause the microprotuberances 19 to rupture, thus forming an apertured material A. In other embodiments, the pressure differential is regulated such that microprotuberances 19 are formed extending from the bottom surface 18 of material A without any rupturing of the microprotuberances 19. In the embodiment shown in FIG. 1A, each microprotuberance 19 has at least one side wall 21 which terminates at a non-apertured distal end 23.

The vacuum chamber 26 generally comprises a leading edge 28 and a trailing edge 29. The microprotuberances 19 are generally formed in an area adjacent the leading edge 28 of the vacuum chamber 26. As the film A moves towards the trailing edge 29, the vacuum pressure differential cools and sets the microprotuberances 19 in the film A. The width between the leading edge 28 and trailing edge 29 can be varied such that the film spends greater or less time under the pressure differential. The length of time also helps hold the microprotuberance formation such that the film cools and "sets" or embosses the microprotuberances in the film.

A second material B is laminated onto the top surface 16 of the film A. The material B generally has a top surface 32 and a bottom surface 34. In the embodiment shown, the material B is generally dispensed from a roll 35. It should be understood that the material B can be supplied in other methods, including directly from a film forming process (not shown). The material B shown in FIGS. 1 and 1A is an apertured three-dimensional thermoplastic material having a plurality of ruptured microprotuberances 37 extending from the bottom surface 34 of the material B Each ruptured or apertured microprotuberance 37 has at least one side wall 41 which terminates at an opening or aperture 43. However, it should be understood that the material B can be a flat or non-apertured three-dimensional thermoplastic or non-thermoplastic film.

In the embodiment shown in FIGS. 1 and 1A, the material B is laminated onto the top surface 16 of the film A at a point prior to the formation of microprotuberances of the material A. The material B is passed over at least one roll 36 and brought into close proximity to the material A. The proximity of the roll 36 to the film material A can be varied. The placement of the roll 36 can be as close to the die 10 as shown in phantom as roll 36'. Alternatively, the roll 36 can be placed further downstream as shown in phantom as roll 36". The film material B can be brought into contact with film A anywhere along the surface of film A. In certain preferred embodiments of the present invention, the roll 36 is spaced at a predetermined distance from the surface 22 of the screen 20. A gap 38 generally defines the distance between the roll 36 and the screen 20. The preferred gap 38 between the roll 36 and screen 22 is determined by the effective thicknesses of each of the materials A and B being laminated together. In certain embodiments, the length of the gap 38 is much greater than the effective thicknesses of each material A and B. In certain other embodiments, the length of the gap 38 is slightly less than the effective thicknesses of each material A and material B. As materials A and B pass through the gap 38, the effective thicknesses of the materials A and B are reduced somewhat. In certain embodiments, the length of the gap 38 can range from about 50% to about 99% of the effective thicknesses of the material A and material B being laminated together. In various embodiments, the gap 38 is about 75% to about 95% of the effective thicknesses of each material A and material B.

As the microprotuberances 37 of material B are brought into contact with the top surface 16 of material A, significant bonding occurs between material A and material B. In the embodiment shown in FIG. 1, the material B is laminated to the top surface 16 of the material A at an interface point 40 just prior to applying the pressure differential to the material A in order to form the microprotuberances in the material A. It is to be understood that the point of interface between material A and material B is dependent upon a number of factors including the temperatures of materials A and B, the chemical composition of the materials A and B, the physical characteristics of the materials A and B (such as whether flat or three-dimensional, apertured or non-apertured) and the like. Thus, material B can be brought into contact with material A at various points along the stream of the extruded material A, as shown by roll 36' and roll 36".

The surface temperature of the film A being extruded is within or higher than the melting range temperature of the thermoplastic material making up the laminating surface of the film B. Material A is extruded at a predetermined elevated temperature such that the microprotuberances 19 can be readily formed in the material A. The elevated temperature of the material A provides heat energy at the point of interface 40 such that the apertures 43 on the bottom surface 34 of material B will significantly bond to the top surface 16 of the material A. It is to be understood that the roll 36 can either be heated or cooled to provide a predetermined amount of heat energy as material B is being laminated onto material A. In certain embodiments, the material B can be preheated by a heating means 42 to aid in raising the temperature of material B such that material B readily bonds to material A. In still other embodiments, not shown, successive portions of the material B can be passed adjacent the extruded material A such that heat radiating from material A preheats the material B. In such embodiments, it is contemplated that roll 36' can be spaced apart from the top surface 16 of material A and that roll 36 can actually bring material B into contact with material A.

In certain embodiments as materials A and B pass through the gap 38, both materials A and B can be compressed somewhat such that the microprotuberances 37 on material B are slightly distorted and are bonded or laminated to the top surface 16 of the material A. In certain embodiments as the materials A and B pass through the gap 38, the preferred amount of pressure is slight, yet sufficient to achieve lamination without greatly distorting the films or causing the microprotuberances 37 to collapse or melt together. According to the present invention, the portions of the material B which are in contact with the film material A reach a fusion, melting or softening point temperature such that the material B readily bonds or laminates to material A.

In other embodiments, no pressure is applied to the material A and material B being laminated together. The materials A and B are brought into contact with each other at the gap 38 and by mere contact with each other, the film materials A and B are laminated together. In addition, the chemical composition of each film material determines its tackiness or adhesiveness to other materials. The gap between the roll 36 and the screen 20 can be adjusted to account for such differences or similarities between the polymers used in the laminating film materials.

Figure 2:
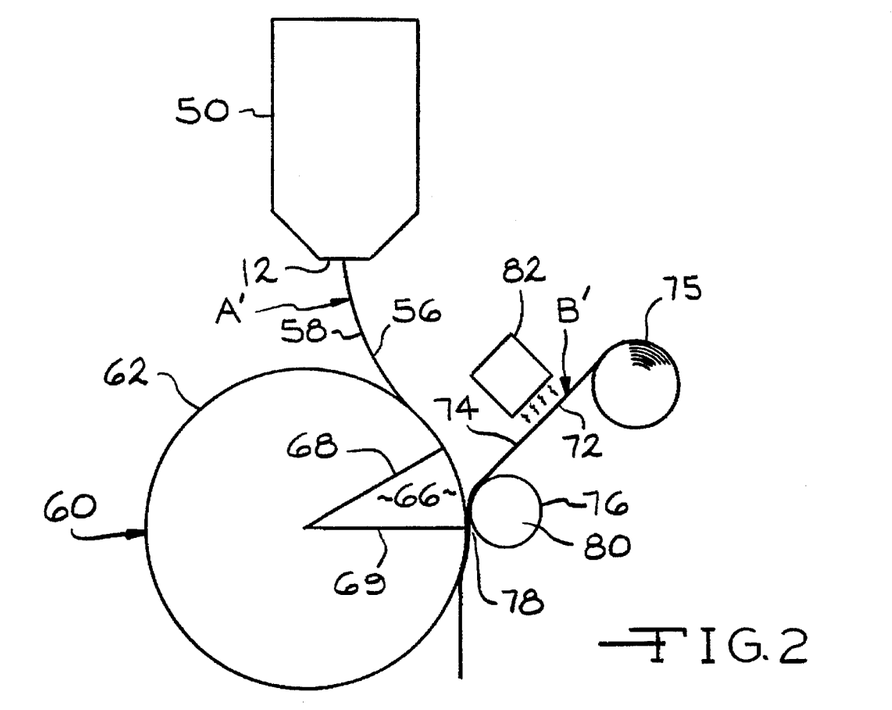
FIG. 2 is a simplified cross-sectional schematic illustration of another process for laminating a material B onto one side of a material A.
Figure 2A:
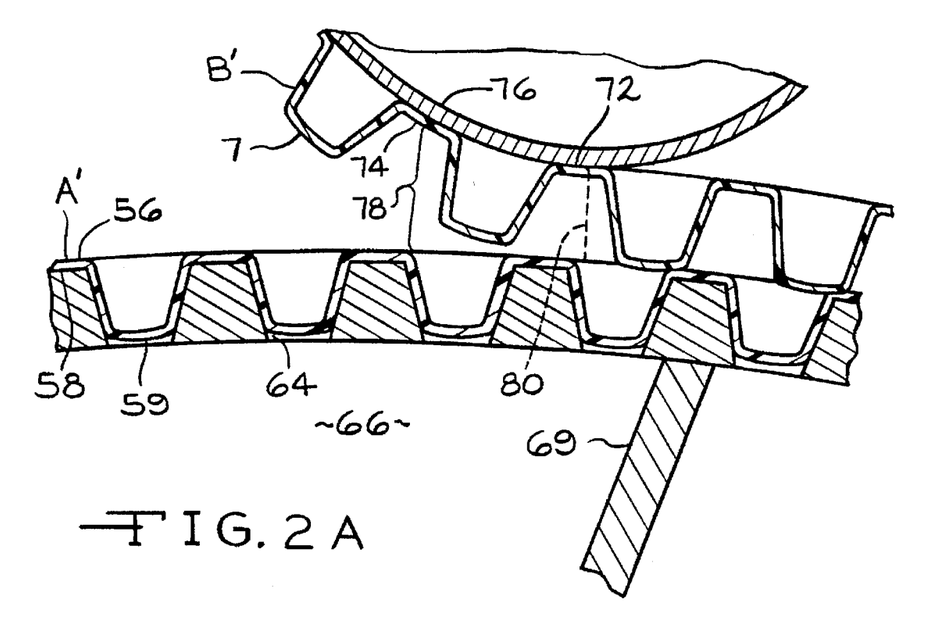
FIG. 2A is a greatly enlarged cross-sectional illustration of the gap area shown in FIG. 2.

Another embodiment of the present invention is generally shown in FIGS. 2 and 2A. A first material A' is dispensed from a slot die 50 having an aperture 52 onto a screen 60. In preferred embodiments of the present invention, the aperture 52 is spaced at a predetermined distance from the screen 60. The screen 60 has a surface 62 which is highly perforated with perforations 64 (seen in FIG. 2A) shown in a greatly enlarged manner for ease of illustration. The perforations 64 extend through the surface 62 to allow fluid such as air to pass through the surface 62 of the screen 60. A vacuum chamber 66, preferably located within the screen 60, is utilized to create a pressure differential.

The material A', being dispensed onto the screen 60, has a top surface 56 and a bottom surface 58. The vacuum chamber 66 creates a pressure differential between the top surface 56 and the bottom surface 58 of the material A'. The pressure differential causes portions of the material A' to be pulled into the perforations 64 in the screen 60. The pressure differential is sufficient to produce three-dimensional micro- protuberances 59 on the bottom surface 58 of the material A', as best seen in FIG. 2A. In various embodiments, the pressure differential is sufficient to cause the microprotuberances 59 to rupture, thus forming an apertured material A'. In other embodiments, the pressure differential is regulated such that microprotuberances 59 are formed extending from the bottom surface 58 of material A' without any rupturing of the microprotuberances 59.

The vacuum chamber 66 generally comprises a leading edge 68 and a trailing edge 69. The microprotuberances are generally formed in an area adjacent the leading edge 68 of the vacuum chamber 66. As the film A' moves towards the trailing edge 69, the vacuum pressure differential cools and sets the microprotuberances 59 in the film A'. The width between the leading edge 28 and the trailing edge 29 can be varied.

A second material B' is laminated onto the top surface 56 of the film A'. The material B' generally has a top surface 72 and a bottom surface 74. In the embodiment shown, the material B' is generally dispensed from a roll 75. It should be understood that the material B' can be supplied in other methods, including directly from a film forming process (not shown). The material B' shown in FIGS. 2 and 2A is non-apertured three-dimensional thermoplastic or non-thermoplastic material having a plurality of microprotuberances 77 extending from the bottom surface 74 of the material B'. However, it should be understood that the material B' can be a flat or other non-apertured three-dimensional thermoplastic or non-thermoplastic film. In the embodiments shown in FIGS. 2 and 2A, the material B' is laminated onto the top surface 56 of the film A' at a point after the microprotuberances 59 are formed in the material A'. The material B' is passed over a roll 76 and brought into close proximity to the material A'. In preferred embodiments of the present invention, the roll 76 is spaced at a predetermined distance from the surface 62 of the screen 60. A gap 78 generally defines the distance between the roll 76 and the screen 60. The preferred gap 78 between the roll 76 and screen 60 is determined by the effective thicknesses of each of the materials A' and B' being laminated together. It is to be understood, however, that in certain other embodiments, the gap 78 is greater than the effective thickness of the materials A and B. In certain other embodiments, the length of the gap 78 is slightly less than the effective thicknesses of each material A' and material B'. As films A' and B' pass through the gap 78, the effective thicknesses of the materials are reduced somewhat. In certain embodiments, the length of the gap 78 can range from about 50% to about 99% of the effective thicknesses of the material A' and material B' being laminated together. In various embodiments, the gap 78 is about 75% to about 95% of the effective thickness of each material A' and material B'. As the microprotuberances 59 of material B' are brought into contact with the top surface 56 of material A', significant bonding occurs between material A' and material B'.

In the embodiment shown in FIG. 2, the material B' is laminated to the top surface 56 of the material A' at an interface point 80 after the perforations are formed in material A'. Material A' is extruded at a predetermined elevated temperature such that the microprotuberances 59 can be formed and set in the material A. The elevated temperature of the material A' provides heat energy such that the microprotuberances 77 on the bottom surface 74 of material B' will significantly bond to the top surface 56 of the material A'. It is to be understood that the roll 76 can either be heated or cooled to provide a predetermined amount of heat energy as material B' is being laminated onto material A'. In addition, a heating means 82 can preheat the material B'.

In certain embodiments, as materials A' and B' pass through the gap 78, both materials A' and B' are compressed somewhat such that the microprotuberances 77 on material B' are slightly distorted and are bonded or laminated to the top surface 56 of the material A'. As the materials A' and B' pass through the gap 78, the preferred amount of pressure is slight, yet sufficient to achieve lamination without greatly distorting the films or causing the microprotuberances 77 to collapse or melt together. As discussed above with respect to FIGS. 1 and 1A, in certain other embodiments, no pressure is applied at the point of interface and bonding occurs upon contact of material A' with material B'.

It should be understood that the roll 76 can be adjacent the trailing edge 69 of the vacuum chamber 66 or alternatively, the roll 76 can be placed downstream beyond the trailing edge 69 of the vacuum chamber 66. The position of the roll 76 is determined, in part, by the temperature of the material A' and material B'. In addition, the gap 80 can be adjusted to conform to the relative effective thicknesses of the films.

Various embodiments of the present invention are shown in FIGS. 3–12. It is to be understood, however, that other combinations of laminating one film to another film are within the scope of the present invention. In particular, the film material A and film material B can comprise multi-layer structures.

Figure 3:
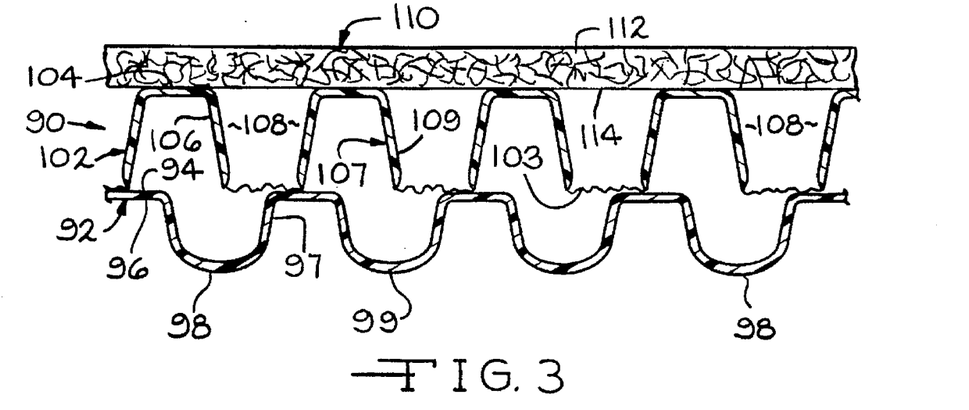
FIG. 3 is a simplified, greatly enlarged cross-sectional illustration of one embodiment of a composite film material comprising a three-dimensional apertured film having a planar side and a three-dimensional side, wherein the three-dimensional side of the apertured film is laminated to a planar side of a three-dimensional non-apertured film and a nonwoven material is laminated to the planar side of the apertured film.

FIG. 3 shows a three-dimensional composite laminate film 90 which generally comprises a non-apertured three-dimensional film 92 having a planar surface 94 and a three-dimensional surface 96 having a plurality of microprotuberances 98 depending therefrom. Each microprotuberance 98 has at least one side wall 97 which terminates at a non-apertured distal end 99. The composite film 90 further comprises an apertured three-dimensional film 102 having a planar surface 104 and a three-dimensional surface 106 which defines a plurality of apertures 108 extending therethrough. The three-dimensional surface 106 has a plurality of apertured microprotuberances 107. Each apertured microprotuberances 107 has at least one side wall 109 which terminates at the aperture 108. The three-dimensional surface 106 of the apertured film 102 is laminated to the planar surface 94 of the non-apertured film 92. The composite film 90 further comprises a nonwoven material 110 having an upper surface 112 and a lower surface 114. The lower surface 114 is laminated to the planar surface 104 of the apertured film 102. It is to be understood that this embodiment can be made without the nonwoven material 110 adhered thereto.

Figure 4:
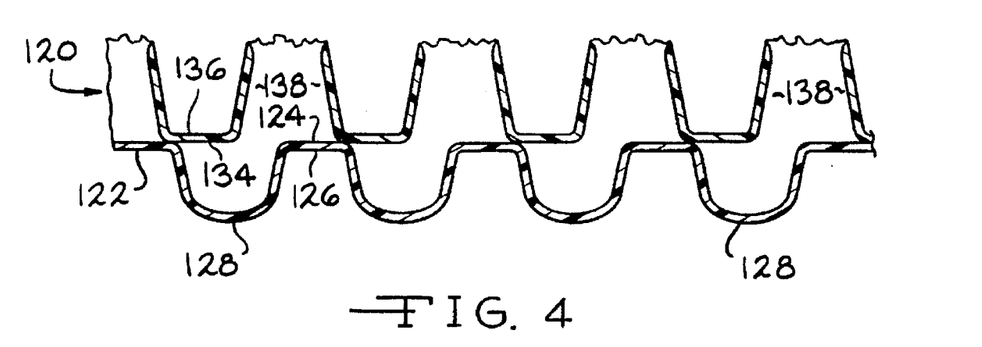
FIG. 4 is a simplified greatly enlarged cross-sectional illustration of another embodiment of a composite film material comprising a three-dimensional apertured film having a planar side and a three-dimensional side, wherein the planar side of the apertured film is laminated to a planar side of a three-dimensional non-apertured film.

FIG. 4 shows a further embodiment of the present invention comprising a composite laminate film 120 comprising a three-dimensional non-apertured film 122 having a planar surface 124 and a three-dimensional surface 126 having a plurality of microprotuberances 128 extending therefrom. The composite film 120 further comprises a three-dimensional apertured film 132 having a planar surface 134 and a three-dimensional surface 136 which defines a plurality of apertures 138 extending therethrough. The planar surface 134 of the three-dimensional apertured film 132 is laminated to the planar surface 124 of the non-apertured film 122. The composite material 120 thus has the planar surfaces 124 and 134 laminated together.

Figure 5:
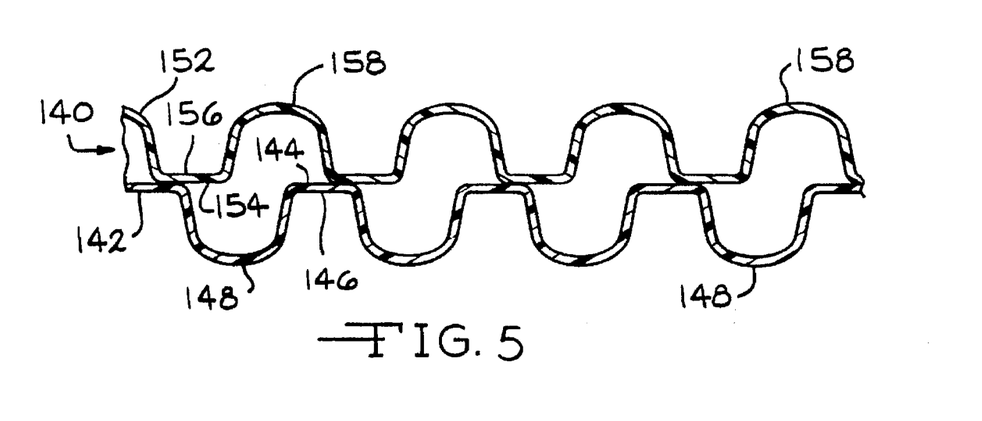
FIG. 5 is a simplified greatly enlarged cross-sectional illustration of another embodiment of a composite film material comprising a first three-dimensional non-apertured film having a planar side of the first film and a three-dimensional side, wherein the planar side of the first film is laminated to a planar side of a second three-dimensional non-apertured film.

FIG. 5 shows a further composite laminate film 140 comprising a first three-dimensional non-apertured film 142 having a planar surface 144 and a three-dimensional surface 146 having a plurality of microprotuberances 148 extending therefrom. The composite film 140 further comprises a second three-dimensional non-apertured film 152 having a planar surface 154 and a three-dimensional surface 156 having a plurality of microprotuberances 158 extending therefrom. The planar surface 154 of the second non-apertured film 152 is laminated to the planar surface 144 of the first non-apertured film 142. The planar surfaces 144 and 154 are laminated together.

Figure 6:
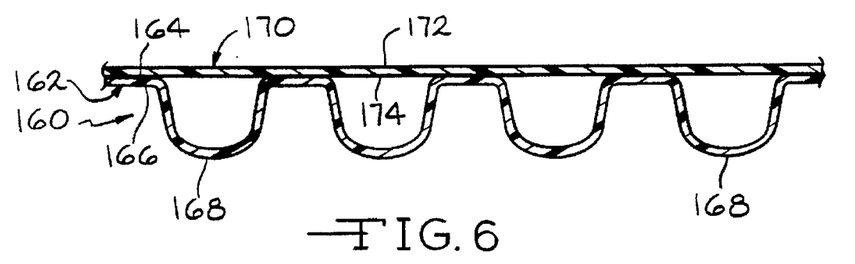
FIG. 6 is a simplified greatly enlarged cross-sectional illustration of another embodiment of a composite film material comprising a flat or planar material laminated to a planar side of a three-dimensional non-apertured film.

FIG. 6 shows a further composite laminate film 160 comprising a three-dimensional non-apertured film 162 having a planar surface 164 and a three-dimensional surface 166 having a plurality of microprotuberances 168 extending therefrom. The composite film 160 further comprises a relatively planar or flat film 170 having a top surface 172 and a bottom surface 174. The planar surface 164 of the non-apertured film 162 is laminated to the bottom surface 174 of the film 170.

Figure 7:
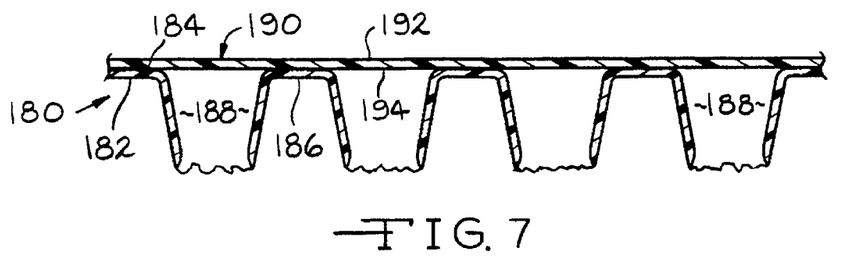
FIG. 7 is a simplified greatly enlarged cross-sectional illustration of another embodiment of a composite film material comprising a flat or planar thermoplastic film laminated to a planar side of a three-dimensional apertured film.

FIG. 7 shows a further composite laminate material 180 comprising a three-dimensional apertured film 182 having a planar surface 184 and a three-dimensional surface 186 which defines a plurality of apertures 188 extending therethrough. A relatively planar or flat film 190 having a upper surface 192 and a lower surface 194 is laminated to the three-dimensional apertured film 182 such that the planar surface 184 and lower surface 194 are laminated together.

Figure 8:
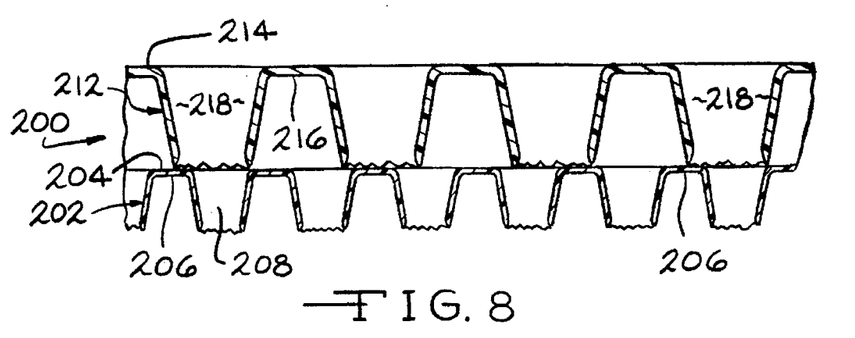
FIG. 8 is a simplified greatly enlarged cross-sectional illustration of another embodiment of a composite film material comprising a first three-dimensional apertured film having a planar side and a three-dimensional side, wherein the three dimensional side of the first film is laminated to a planar side of a second three-dimensional apertured film.

FIG. 8 shows a further composite laminate material 200 comprising a first three-dimensional apertured film 202 having a planar surface 204 and a three-dimensional surface 206 which defines a plurality of apertures 208 having a first predetermined size, which apertures 208 extend through the film 202. The composite film 200 further comprises a second three-dimensional apertured film 212 having a planar surface 214 and a three-dimensional surface 216 which defines a plurality of apertures 218 having a second predetermined size, which apertures 218 extend through the film 212. The three-dimensional surface 216 of the second film is laminated to the planar surface 204 of the first apertured film 202. In the embodiment shown in FIG. 8, the microapertured film 202 has smaller apertures 208 than the apertures 218 of the film 212.

Figure 9:
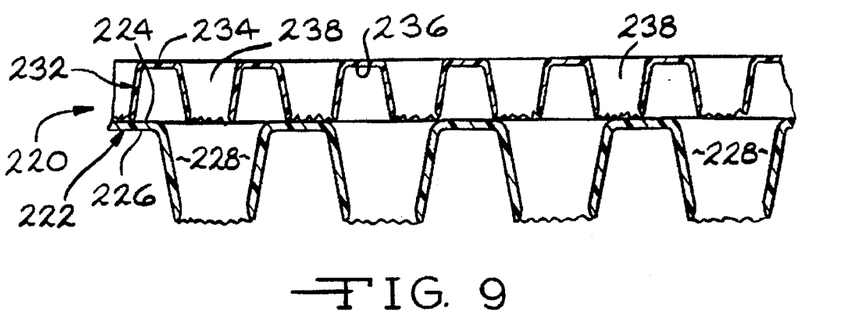
FIG. 9 is a simplified greatly enlarged cross-sectional illustration of another embodiment of a composite film material comprising a first three-dimensional apertured film having a planar side and a three-dimensional side, wherein the three dimensional side of the first film is laminated to a planar side of a second three-dimensional apertured film.

FIG. 9 shows a further composite laminate material 220, wherein a smaller apertured film is laminated to a larger apertured film. The film 220 comprises a first three-dimensional apertured film 222 having a planar surface 224 and a three-dimensional surface 226 which defines a plurality of apertures 228 extending therethrough. The composite film 220 further comprises a second three-dimensional apertured film 232 having a planar surface 234 and a three-dimensional surface 236 which defines a plurality of apertures 238 extending therethrough. The three-dimensional surface 236 of the second film is laminated to the planar surface 224 of the first film 220.

Figure 10:
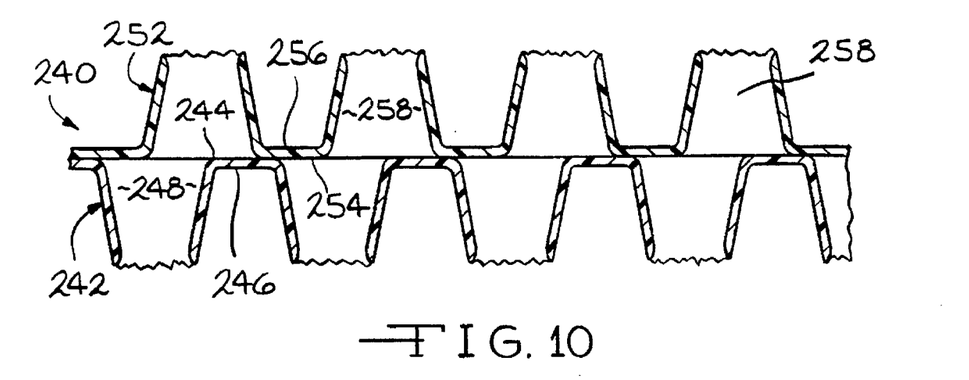
FIG. 10 is a simplified greatly enlarged cross-sectional illustration of another embodiment of a composite firm material comprising a first three-dimensional apertured film having a planar side and a three-dimensional side, wherein the planar side of the first film is laminated to a planar side of a three-dimensional apertured film.

FIG. 10 shows a further composite laminate film 240 comprising a first three-dimensional apertured film 242 having a planar surface 244 and a three-dimensional surface 246 which defines a plurality of apertures 248 extending therethrough. The composite film 240 comprises a second three-dimensional apertured film 252 having a planar surface 254 and a three-dimensional surface 256 which defines a plurality of apertures 258 extending therethrough. The planar surface 254 of the second film 252 is laminated to the planar surface 244 of the first film 242.

Figure 11:
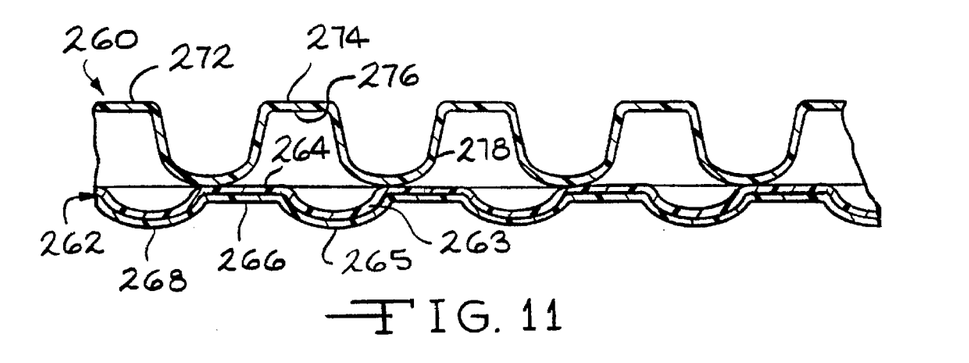
FIG. 11 is a simplified greatly enlarged cross-sectional illustration of another embodiment of a composite film material comprising a three-dimensional non-apertured film having a planar side and a three-dimensional side, wherein the three-dimensional side of the non-apertured film is laminated to a planar side of a coextruded three-dimensional non-apertured film.

FIG. 11 shows a further composite material 260 comprising a three-dimensional coextruded non-apertured film 262 having a planar surface 264 and a three-dimensional surface 266 having a plurality of microprotuberances 268 extending therefrom. The film 262 is a coextruded material having a first layer 263 and a second layer 265. The layer 263 can have physical properties or melt temperature properties which allow the film 262 to readily laminate to a film 272. The bottom layer 265 can provide other properties such as strength and/or high melt characteristics to the composite material 260. The composite material 260 further comprises the second three-dimensional non-apertured film 272 having a planar surface 274 and a three-dimensional surface 276 having a plurality of microprotuberances 278 extending therefrom. The three-dimensional surface 276 is laminated to the planar surface 264 of the film 262.

Figure 12:
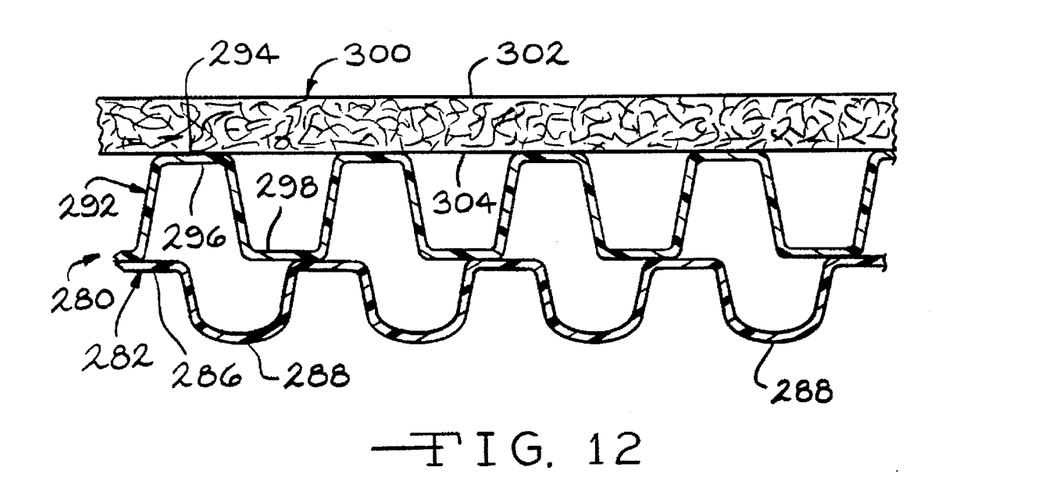
FIG. 12 is a simplified greatly enlarged cross-sectional illustration of another embodiment of a composite film material comprising a first three-dimensional non-apertured film material having a planar side and a three-dimensional side, wherein the three-dimensional side of the first film is laminated to a three-dimensional side of a second three-dimensional non-apertured film and wherein a nonwoven material laminated to the planar side of the second material.

FIG. 12 shows a further composite material 280 comprising a first three-dimensional non-apertured film 282 having a planar surface 284 and a three-dimensional surface 286 having a plurality of microprotuberances 288 extending therefrom. The composite film 280 further comprises a second three-dimensional non-apertured film 292 having a planar surface 294 and a three-dimensional surface 296 which defines a plurality of microprotuberances 298 extending therefrom. The three-dimensional surface 298 of the second film 292 is laminated to the planar surface 284 of the first film 282. The composite film 280 further comprises a nonwoven material 300 having an upper surface 302 and a lower surface 304. The lower surface 304 is laminated to the planar surface 294 of the second non-apertured film 298. It is to be understood that this embodiment can be made without the nonwoven material 300 adhered thereto.

It is to be understood that each of the laminating materials can comprise further layers including nonwoven materials on either the planar or three-dimensional sides of the films.

Combinations of laminated materials can be created which are useful in numerous commercial products to fill currently unmet consumer needs. For example, the composite film in FIG. 3 provides a barrier film having a dull soft surface suitable for disposable and medical products. The composite film shown in FIG. 4 provides similar barrier properties and shows a film having a soft high loft apertured side. The composite film shown in FIG. 5 is especially useful for bubble packaging materials for delicate and expensive components. The composite film shown in FIG. 6 is also useful for bubble packages to provide physical protection wherein at least one of the films can be a barrier type film for use in shelf life extension of food and other items. The composite film shown in FIG. 7 is especially useful in disposable products applications, wherein a barrier film is needed and wherein a feeling of softness and dullness is provided by the apertured film. The composite film shown in FIG. 8 is especially useful in applications for a feminine product topsheet utilizing a dual aperture size concept in having a greater embossed depth. Alternatively, the film is useful in other applications requiring a larger initial pore or aperture size which overlays a smaller aperture size. The composite film shown in FIG. 9 is useful for any application which requires a larger embossed thickness, possibly for fluid storage or layer separation with a finer top cover for tactile and visual effects. One especially useful application is useful for a diaper backsheet. The composite film of FIG. 10 is useful to replace currently used, but expensive, nonwoven materials. The composite film shown in FIG. 10 has a soft three-dimensional side of the film as an outer surface. The composite film shown in FIG. 11 provides a further embodiment of bubbled film products wherein the microprotuberances can have different configurations. FIG. 12 provides a barrier film having a high loft and dull surface suitable for disposable and medical products.

It is to be understood that there are many other composite films that can be formulated using the method of the present invention. While particular embodiments of the present invention have been illustrated and described, it will be obvious to those skilled in the art that various changes and modifications can be made without departing from the spirit and scope of the invention and it is intended that the claims herein cover all such modifications that are within the scope of this invention.

We claim:

1. A composite material comprising at least one layer of a thermally sensitive three-dimensional first material laminated to at least one layer of a second material without causing thermal distortion or damage to the first or second materials; wherein the first material comprises a three-dimensional non-apertured material having a planar side and a three-dimensional side, the three-dimensional side of the first, non-apertured material defining a plurality of non-apertured microprotuberances, each microprotuberance having a thickness and mass that are less than a thickness and mass of the material forming the planar side of the first, non-apertured material; and the second material comprises a three-dimensional, apertured material having a planar side and a three-dimensional side, the three-dimensional side of the second, apertured material defining a plurality of apertured microprotuberances, each apertured microprotuberance having at least one side wall which terminates at an aperture, each microprotuberance having a thickness and mass that are less than a thickness and mass of the material forming the planar side of the second, apertured material, wherein the three dimensional, apertured side of the second material is laminated to the planar side of the first material.

2. The composite material of claim 1, wherein at least one layer comprising a nonwoven material is laminated or adhered to the planar side of the second material.

3. The composite material of claim 1, wherein the first material comprises at least one layer of a coextruded material having at least two layers.

4. The composite material of claim 1, wherein the second material comprises at least one layer of a coextruded material having at least two layers.

5. The composite material of claim 1, wherein the first material comprises at least one layer of a thermoplastic material.

6. The composite material of claim 1, wherein the second material comprises at least one layer of a thermoplastic material.

7. The composite material of claim 1, wherein the second material comprises at least one layer of a non-thermoplastic material.

8. The composite material of claim 1, wherein the first material comprises a predetermined amount of polyethylene and the second material comprises a predetermined amount of ethylene vinyl acetate.

9. An absorbent article comprising a backsheet formed from a composite material, said composite material comprising at least one layer of a thermally sensitive three-dimensional first material laminated to at least one layer of a second material without causing thermal distortion or damage to the first or second materials; wherein the first material comprises a three-dimensional non-apertured material having a planar side and a three-dimensional side, the three-dimensional side of the first, non-apertured material defining a plurality of non-apertured microprotuberances, each microprotuberance having a thickness and mass that are less than a thickness and mass of the material forming the planar side of the first, non-apertured material; and the second material comprises a three-dimensional, apertured material having a planar side and a three-dimensional side, the three-dimensional side of the second, apertured material defining a plurality of apertured microprotuberances, each apertured microprotuberance having at least one side wall which terminates at an aperture, each microprotuberance having a thickness and mass that are less than a thickness and mass of the material forming the planar side of the second, apertured material, wherein the three dimensional, apertured side of the second material is laminated to the planar side of the first material.

* * * * *